United States Patent Office 3,153,097
Patented Oct. 13, 1964

3,153,097
ACETYLENIC ALCOHOL
Margaret D. Cameron, Beaumont, Tex., assignor to Monsanto Company, a corporation of Delaware
No Drawing. Filed June 11, 1962, Ser. No. 201,308
1 Claim. (Cl. 260—631)

The present invention relates to acetylenic alcohols and more particularly provides 1-(1-propynyl)cyclohexanol as a new compound and the method of producing the same.

I prepare 1-(1-propynyl)cyclohexanol in good yields by contacting methylacetylene with lithium amide in liquid ammonia solution and then reacting the lithium methylacetylide thus obtained with a cyclohexanone substantially according to the scheme:

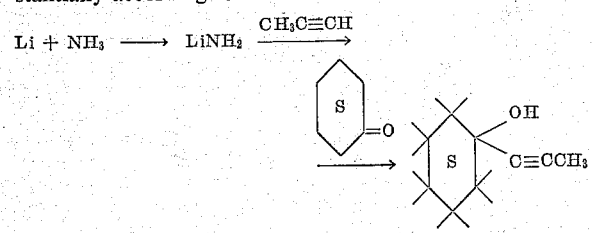

Reaction of the lithium acetylide with the cyclohexanone occurs readily at ordinary room temperature in the presence or absence of an extraneous diluent or solvent such as ether. The 1-(1-propynyl)cyclohexanol is readily separated from the resulting reaction mixture by isolation procedures customarily employed in the art, e.g., by solvent extraction, distillation, etc.

1-(1-propynyl)cyclohexanol is a stable, well-defined crystalline compound having a melting point of ca. 46.5-47° C. While it is very advantageously useful for a variety of commercial and industrial purposes, e.g., as a dispersing agent in the preparation of photographic emulsions, as a selective light absorbing medium and as an anti-static agent in the plastics and textile industries, as will be shown hereinafter, it is particularly useful as a biological toxicant, e.g., as a viricide, herbicide, fungicide and nematocide.

The invention is further illustrated, but not limited, by the following examples:

*Example 1*

This example describes the preparation of 1-(1-propynyl)cyclohexanol. To one liter of liquid ammonia there was added 1.2 g. of lithium wire in ten additions (corresponding to a total of 90″ of wire which had been cut in ½″ lengths). Methylacetylene was bubbled into the resulting mixture for 15 minutes, at the end of which time, the reaction mixture appeared black. One liter of ether was then added and the solution allowed to stand overnight. At the end of that time, 104 ml. (98 g.) of cyclohexanone and 146 ml. of ether were added, dropwise, to the mixture. After standing for a time, it was treated with saturated aqueous ammonium chloride. The organic layer which formed was removed and the aqueous layer was extracted three times with 250 ml. of ether. The combined ether layer and extract was dried over magnesium sulfate and evaporated under reduced pressure. Distillation of the residue gave (I) 8.0 g. of a fraction, B.P. 80–95° C./20 mm., (II) 42.0 g. of a fraction, B.P. 95–104° C./20 mm., M.P. 46.5–47° C. and (III) 36.0 g. of a fraction, B.P. 103–104° C./20 mm., M.P. 47° C. Fractions II and III comprised the substantially pure 1-(1-propynyl)cyclohexanol. An additional 2 g. of this compound was obtained from fraction I by freezing in an ice bath, and filtering at room temperature. The total yield of 1-(1-propynyl)cyclohexanol (80 g.) thus corresponded to a 77% theoretical yield.

*Example 2*

This example shows the evaluation of 1-(1-propynyl)cyclohexanol and of 1-(2-propynyl)cyclohexanol as pre-emergent herbicides. Briefly, the test chemical was applied in spray form to soil seeded to respective grasses and broad-leafed plants. Aluminum pans 13″ x 9″ x 2″ were filled with top soil which had been screened through a ¼″ wire mesh and mixed with sand in a preparation of two parts of top soil to one part of sand. After compacting the soil surface to a depth of ⅜″ from the top of the pan, 20 seeds each of wild oat, brome grass, rye grass, buckwheat, radish, red clover, sugar beet, cotton, and cucumber were scattered randomly over the soil surface. They were then covered with soil to the pan top.

Respective test solutions of the compound were prepared by dissolving 0.4 g. of the compound in 20 cc. of acetone and then diluting 10 ml. of the solution with water to make up 30 cc. of a 25 lbs./acre rate test material. The 30 cc. of test material is calculated to provide 0.2 g. of the alkanol per pan. The planted pans were placed in an exhaust hood and sprayed first with 30 cc. of an aqueous solution of a liquid fertilizer then with an 0.1% solution of octamethyl pyrophosphoramide and finally with either the 30 cc. of said solution of 1-(1-propynyl)cyclohexanol or the 30 cc. of the solution of 1-(2-propynyl)cyclohexanol. The liquid fertilizer was employed to give a uniform nutrition level and the amide was employed to prevent insect injury. A "blank" was prepared by like seeding and fertilizing and insecticidal treatment. The "blank" as well as the pans which had been sprayed with the test solutions were then placed in water and allowed to absorb moisture through perforated bottoms until the soil surface was completely moist. The pans were then transferred to a wet-sand bench in the greenhouse and maintained there for 10 days under ordinary conditions of sunlight and watering.

Inspection of the pans at the end of that time showed complete prevention of germination and growth in the pan which had been sprayed with the 30 cc. of solution of the 1-(1-propynyl)cyclohexanol. On the other hand, the "blank" and those pans which had been sprayed with the 30 cc. of 1-(2-propynyl)cyclohexanol showed equally profuse growth.

Thus, test data show that for herbicidal activity the acetylenic triple bond should be in the 1- rather than the 2-position with respect to the alcohol radical. Test data also indicate that the presence of methyl groups on the cyclohexanol ring render the compounds ineffective as pre-emergent herbicides.

*Example 3*

This example shows evaluation of 1-(1-propynyl)cyclohexanol and 1-ethynylcyclohexanol against the nematode *Panagrellus redivivus*.

To a vessel of water containing about 250 live nematodes, there was added a quantity of one of said test compounds to produce a 0.1% concentration of the same in the water. The organisms were examined at intervals over a 2-hour period by means of a stereoscopic microscope and their motility estimated and recorded at timed intervals. At the same time a "control" vessel of the same number of said nematodes in water containing no additive was examined. The following results were obtained:

| Percent Motility after— | 1-(1-propynyl)-cyclohexanol | 1-ethynyl-cyclohexanol | Control |
|---|---|---|---|
| 10 min | 75 | 100 | 100 |
| 20 min | 75 | 100 | 100 |
| 30 min | 60 | 100 | 100 |
| 60 min | 50 | 100 | 100 |
| 2 hrs | 25 | 100 | 100 |

The above data shows for the 1-(1-propynyl)cyclohexanol a progressive nematocide effect which increases with time. On the other hand, the closely related 1-ethynylcyclohexanol is shown to have absolutely no effect.

Example 4

Fungicidal evaluation of 1-(1-propynyl)cyclohexanol and of 1-ethynylcyclohexanol was conducted against the fungus *Fusarium lycopersici*. The following procedure was used:

Two-week old Bonny Best tomato seedlings were immersed in an aqueous solution containing 100 p.p.m. of either the 1-(1-propynyl)cyclohexanol or the 1-ethynylcyclohexanol. After 48 hours, the seedlings were removed and the root systems were rinsed thoroughly in tap water to remove any chemical residue. Approximately one-third of each lateral root system of each plant was severed and the wounded roots were dipped for 30 seconds in a suspension of Fusarium bud cells. The inoculated plants were immediately potted in steamed soil. Each treatment was replicated three times, and "controls" were prepared by similarly inoculating and potting tomato seedlings which had not been exposed to a test compound. The potted plants were then set in the greenhouse for observation. Those of the plants which had been treated with the 1-ethynylcyclohexanol showed Fusarium wilt symptoms to the same extent as the "controls"; i.e., the plants which had not been treated with a chemical. On the other hand, suppression of the fungus was noted for those of the plants which had been treated with the 1-(1-propynyl)cyclohexanol.

Example 5

The inhibiting effect of 1-(1-propynyl)cyclohexanol and of 1-ethynylcyclohexanol against the multiplication of tobacco mosaic virus was determined substantially according to the method of Commoner et al., Arch. Biochem. Biophys., 27, 271 (1950). Briefly, the procedure involves inoculation of a young leaf of a healthy plant with the virus and, after 24 hours, contact of portions of the inoculated leaf with the test compounds.

The leaf was inoculated with Johnson tobacco virus by rubbing its entire surface with a gauze pad moistened with a phosphate buffer solution (pH 7.0) containing 200 μg. of the virus per milliliter. After inoculation, the leaf was placed under a bell-jar with its petiole in water for 24 hours. At the end of this time, six 0.5" discs were punched from the leaf, weighed, washed in water and placed in a 3.5" Petri dish containing a $10^{-4}$ molar concentration of either the 1-(1-propynyl)cyclohexanol or the 1-ethynylcyclohexanol in 15 ml. of half-strength Vickery's solution (Vickery et al., Bull. Conn. Agr. Expt. Sta., 399 (1937)) which had been prepared to have a final concentration of $5 \times 10^{-3}$ mole of $KH_2PO_4$. A "control" was prepared by placing another set of six discs which had been punched from the inoculated leaf into a Petri dish containing 15 ml. of the same Vickery's solution but no test compound. Both dishes of discs were incubated for seven days under fluorescent light of 170 foot candles. At the end of that time the discs were removed and two groups of three were made up from each dish in order to provide "checks." The tobacco mosaic virus content of each group was determined as described by Commoner et al. (loc. cit.) except that the final washing step thereof was omitted because it had been previously observed that this step in the isolation procedure results in some loss of virus. The colorimetric measurements were made at 750 mu in a Coleman Universal Spectrophotometer and the amount of virus was read from a standard curve prepared with known amounts of the tobacco mosaic virus.

Employing this procedure it was found that the virus content of the group of discs which had been contacted with the 1-(1-propynyl)cyclohexanol was only 52% of that of the "control" discs, i.e., a 48% inhibition of the virus was effected by the 1-(1-propynyl)cyclohexanol. On the other hand, the virus content of the group of discs which had been contacted with the 1-ethynylcyclohexanol was the same as that of the "control" discs, i.e., zero inhibition of the virus was effected by the 1-ethynylcyclohexanol.

This application is a continuation-in-part of my application, Serial No. 766,181, filed October 9, 1958, now abandoned, which is a continuation-in-part of my application, S.N. 580,192, filed April 24, 1956, now abandoned.

What I claim is:

1-(1-propynyl)cyclohexanol.

References Cited in the file of this patent

Beilstein: Handbuch der Organischen Chemie, vol. 6 (1st supplement), page 61 (1931).